2,531,179

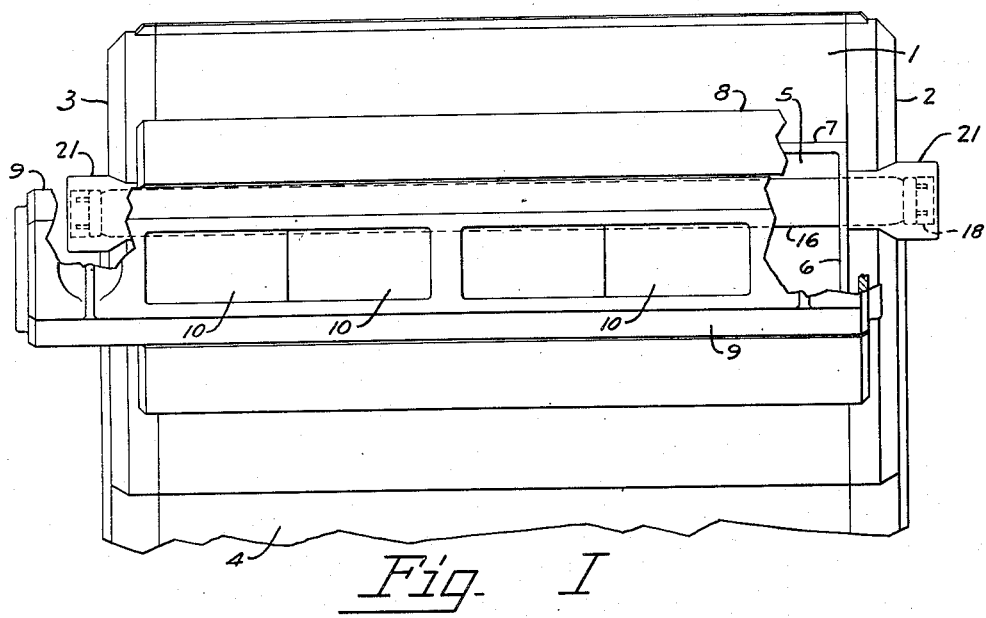
Fig. I
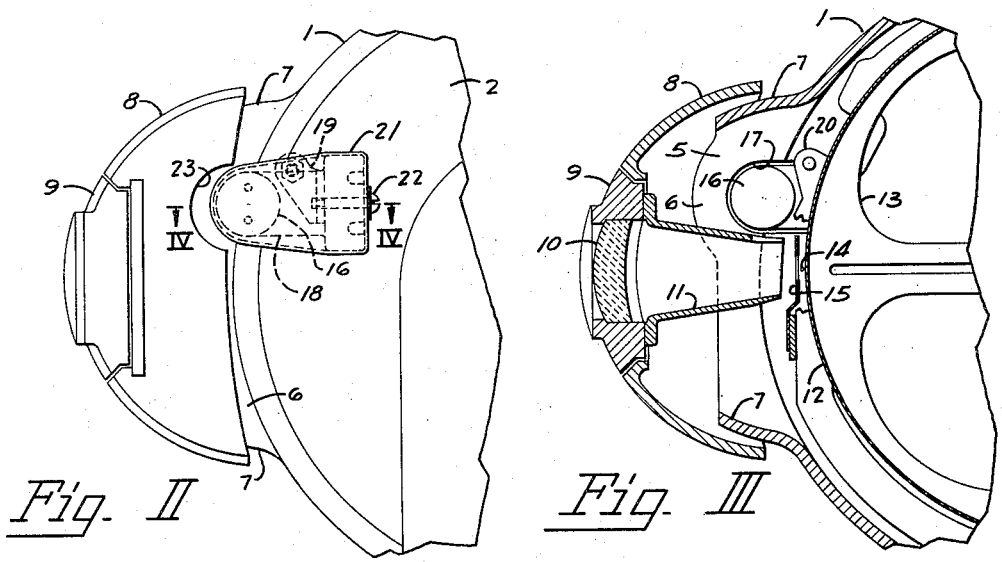
Fig. II  Fig. III
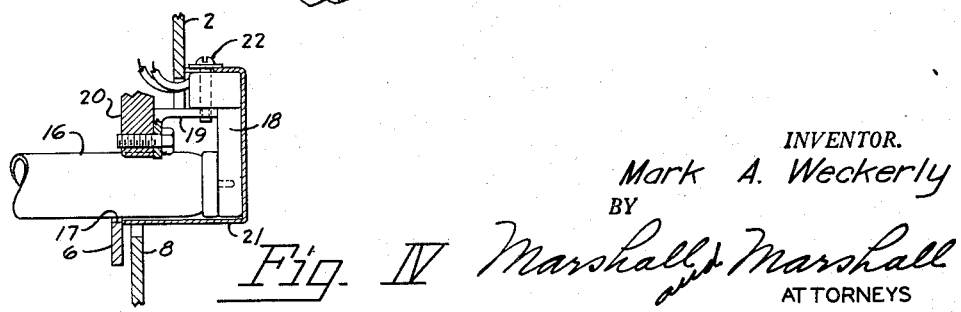
Fig. IV
INVENTOR.
Mark A. Weckerly
BY
Marshall & Marshall
ATTORNEYS Nov. 21, 1950 M. A. WECKERLY 2,531,179
WEIGHING MACHINE ILLUMINATOR
Filed May 30, 1945 2 Sheets-Sheet 2
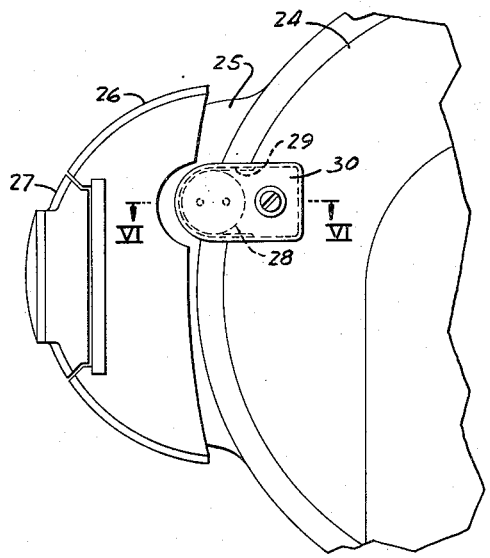
Fig. V
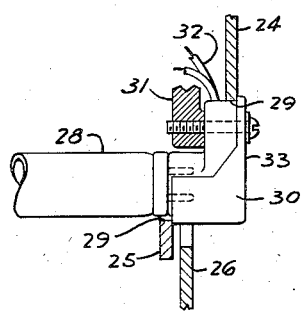
Fig. VI
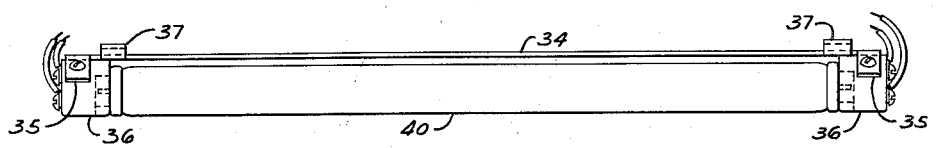
Fig. VII
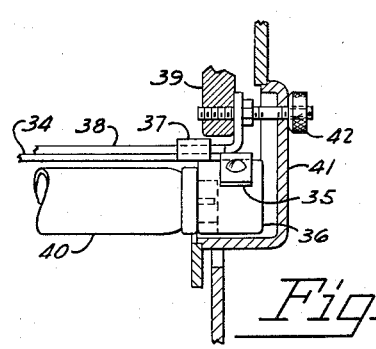
Fig. VIII
INVENTOR.
Mark A. Weckerly
BY
Marshall & Marshall
ATTORNEYS Patented Nov. 21, 1950

UNITED STATES PATENT OFFICE 2,531,179

WEIGHING MACHINE ILLUMINATOR

Mark A. Weckerly, Toledo, Ohio, assignor to Toledo Scale Company, Toledo, Ohio, a corporation of New Jersey Application May 30, 1945, Serial No. 596,629

1 Claim. (Cl. 240—2.11)

This invention relates to weighing scales and in particular to improved means for illuminating the charts of cylinder type scales.

Retail scales commonly used in meat markets and groceries have computed price indicia arranged in columns on a cylindrical chart. A hair line indicator mounted in the housing and extending along the cylinder provides an index against which the money value of a load being weighed on the scale may be read. In order to provide a sufficient number of indicia to cover the commonly used prices throughout the weighing capacity of the scale the individual indicia must be quite small and it is common practice to provide magnifying lenses to facilitate the reading of the scale. This combination of magnifying lenses and a chart enclosed in a housing requires that artificial illumination be provided to illuminate the reading line and the portion of the chart immediately behind it. This illumination is ordinarily provided by a pair of tubular incandescent bulbs mounted in the housing of the scale in the space generally above the reading line and out of the field of view of the magnifying lenses. It is quite difficult to replace these bulbs because they are enclosed in the housing of the scale and of necessity are located in the space behind the frame carrying the magnifying lenses. It is thus necessary to disassemble the scale housing (an operation requiring the services of a scale mechanic) whenever one of the bulbs must be replaced.

The object of this invention is to provide an improved illuminating system for a cylinder scale in which the bulb may be replaced without disassembly of the housing of the scale.

Another object of the invention is to provide a more even illumination of the chart of a cylinder scale.

These and other objects and advantages are apparent from the following description taken in connection with the accompanying drawings illustrating preferred embodiments of the invention.

In the drawings:

Figure I is a front elevation, with parts broken away, of a chart housing of a retail cylinder scale.

Figure II is a fragmentary end elevation of the cylinder scale chart housing.

Figure III is a fragmentary vertical section taken transversely to the axis of the cylinder chart and showing the relative locations of magnifying lenses, reading line and chart of the scale.

Figure IV is a fragmentary sectional view of one of the sockets for mounting the light source as seen from the line IV—IV of Figure II.

Figure V is a fragmentary end elevation showing a modified form of light source mounting.

Figure VI is a fragmentary section of the modified light source mounting as seen from the line VI—VI of Figure V.

Figure VII shows still another modification of the light source mounting.

Figure VIII is a fragmentary sectional view of a closure adapted to be used with the light source mounting illustrated in Figure VII.

These specific figures and the accompanying description are intended merely to illustrate the invention and not to impose limitations on the claims.

According to the invention the difficulties of replacing light bulbs in retail computing scales are reduced by providing openings in the end housings of the scale substantially in line with the light source and mounting the light source so that the replaceable portions thereof may be inserted and removed through the openings. Suitable easily removed closures are provided for the openings. The replacement of bulbs may be made still more convenient by mounting the bulbs from the closures. In one form the invention consists of mechanically supporting the bulb within the housing and incorporating the electrical connections for the bulb in the closure or in a separate part enclosable and removable with the closure. Regardless of the construction actually employed the openings in line with the light source permit replacement of the light source without disassembly of the scale housing.

In the first example the invention is shown as it is embodied in a common type of cylinder scale. The chart housing of such a scale comprises a substantially cylindrical molded shell I and a pair of generally circular end housings 2 and 3. The housing comprising the cylindrical shell I and the circular end portions 2 and 3 surmounts a generally rectangular column 4 erected from the base of the scale. The end portions 2 and 3 are molded so as to form part of the rectangular column 4 as well as covering the ends of the cylinder housing I. On the front side of the scale the housing I is provided with a window 5 and the adjacent parts of the cylinder housing I are molded outwardly to form end walls 6 and top and bottom walls 7 defining the periphery of the window 5. A semi-cylindrical cover 8 is supported from the frame of a scale, by means not shown, in such a position that it covers the window 5 with its edges in overlapping relation with the walls 6 and 7 of the cylindrical shell 1.

A lens frame 9 slidably mounted in the cover 8 carries a plurality of magnifying lenses 10 each of which is positioned at the larger end of a frusto-pyramidally shaped lens cell 11. The lens cells 11 define the field of view of the magnifying lenses 10 and have a convergence approximately equal to the field of the lenses so that when viewed through the lenses the cells appear to have parallel sides. A cylindrical chart 12 carried on spiders 13 is positioned in the scale housing so that a portion of its periphery is within the field of view of the magnifying lenses 10. A reading line 14 serves as an index cooperating with the indicia on the chart 12. The indicia, representing computed money values, are arranged in columns about the periphery of the chart 12 and the individual columns are identifiable by price markings carried on a price bar 15 interposed between the lens cells 11 and the chart 12.

The complete enclosure of the chart by the housing 1, the cover 8 and the lens frame 9 added to the decrease in brightness resulting from the magnification of the lenses 10 requires that artificial illumination be provided within the housing. In this example artificial illumination is provided by a fluorescent tube 16 inserted through openings 17 in the walls 6 defining the window 5. The fluorescent light bulb 16 is carried in sockets 18 mounted on brackets 19 attached to adjacent parts 20 of the frame of the scale. The sockets 18 are clamped to the brackets 19 so as to be easily removable. A cover or closure 21 fitting over the socket 18 and the end of the light bulb 16 adjacent thereto prevents any appreciable leakage of light from the housing. The closure 21 and the lamp socket 18 may be removed by merely loosening a screw 22 which clamps the socket 18 to the bracket 19.

In this improved form of light source the light is distributed very evenly along the full length of the chart and the comparatively large area of the tube diffuses the light so that there is very little glare from the chart. By allowing the light bulb to protrude slightly from the ends of the housing the uniform light intensity is carried to the extreme limits of the chart and the relatively dark end portions of the light bulb cannot be observed nor their effect noticed on the chart. Likewise the protrusion of the light bulb slightly beyond the end of the housing and supporting it there by means of an easily removable socket and closure permits the light bulb to be replaced when necessary by simply removing one socket and withdrawing the bulb. A new bulb may be easily substituted and placed in operation with no further disassembly of the scale housing.

When the chart extends practically the full length of the housing and it is necessary to carry uniform illumination the full length the light bulb protrudes slightly beyond the ends of the cover 8 so that these ends must be provided with notches 23 to permit the cover 8 to clear the closure 21 as the cover 8 and the lens frame is rocked about its horizontal axis. The rocking motion of the cover 8 and lens frame is provided to adjust the viewing angle for persons of different heights so that parallax errors are eliminated.

It is not necessary in all cases that the light bulb extend beyond or protrude through the end of the scale housing. In a second example, shown in Figures V and VI, a weighing scale housing is formed with an end cover 24, a cylindrical shell having a forwardly directed portion 25 providing a viewing window and a semi-cylindrical cover 26 covering the window. Lenses mounted in a lens frame 27 provide enlarged images of indicia on a chart rotatably mounted within the housing. Illumination for the indicia is provided by a light bulb 28 which is inserted through an opening 29 cut through the periphery of the end cover 24 and part of the end wall of the forwardly extending portion 25 of the cylindrical housing. The light bulb 28 is supported in sockets 30 bolted to a portion 31 of the frame of the scale. The socket 30 is an integral member and includes contact means for connecting the terminals of the light bulb 28 to lead wires 32. Its outer surface 33 is made of the same material as the housing and is finished so that it provides a smooth exterior and eliminates the need for any extra enclosure. The socket 30 differs from the socket 18 illustrated in the first example in that the connection is made to the tube by pressing the socket onto the end of the tube while with the socket 18 the tube is secured by giving it a quarter turn after it is in place and the socket 18 is clamped to the bracket 19. In the first example enough of the light bulb protrudes so that it may be grasped and rotated. In the second example the light bulb is entirely within the housing and is therefore inaccessible and the sockets must of necessity be appplied by an axial motion only.

In these two examples a similar bracket and socket is provided at each end of the housing to accommodate the ends of the light bulb. As the light bulb is usually replaced by only removing one of the sockets it is possible to permanently install the other socket either in the end of the housing or on some part of the scale frame adjacent the end. In the latter case it may be difficult to guide the light bulb into engagement with the fixed socket, particularly if the light bulb is equal to or slightly shorter than the length of the housing. This difficulty may be minimized by mounting the light bulb and its sockets on a frame which may be inserted as a unit. Figure VII shows such an assembly which comprises a strip of strap metal 34 provided at its ends with ears 35 to which sockets 36 are attached. Near its ends the strip 34 is provided with lugs 37 which are bent to form substantially C-shaped hooks adapted to engage and slide along a track 38 secured in the scale housing as by bolting to a part 39 of the scale frame. A light bulb 40 may be mounted in the sockets 36 while the strip is outside the scale housing and then slipped into place with the lugs 37 engaging the track 38. The end of the track 38 is reduced in width so that the C-shaped lugs 37 may be easily engaged. A closure 41 held in place by screw or bolting means such as the screw and nut 42 closes the opening through which the light bulb and frame were inserted and prevents any leakage of light through that opening.

Each of the various examples illustrating the invention have been shown with a fluorescent light bulb as the light source. While this type of light source provides the best illumination for a scale it does not necessarily mean that it is the only type of bulb that may be used. Ordinary incandescent tubular bulbs of the so-called "showcase" variety may also be used. When incandescent bulbs are used one or more may be required in a single scale but they may be mounted so as to be replaceable through an opening in the end of the scale housing in substantially the same manner as described in connection with the fluorescent bulbs. This is particularly true in connection with the structure shown in Figures VII and VIII because the light bulb sockets may be located at spaced intervals along the frame 34 as may be required.

These improvements very materially expedite the maintenance of a scale by permitting the user of a scale to replace a defective light bulb without the services of a skilled scale mechanic.

Having described the invention, I claim:

In a light source mounting for a weighing scale, in combination, a chart housing having a pair of end frames, said housing having an opening at each end that exposes a portion of the frame and space above the reading line of the chart of the scale, an elongated bulb that extends between the end frames and that is insertable through the openings, and a socket for each end of the bulb, said sockets being mounted externally of the frame and housing and electrically connected to wiring within the housing, said sockets being removably secured to said end frames and constituting covers for the openings whereby the light bulb may be replaced without disassembly other than the removal of a socket from the frame.

MARK A. WECKERLY.

REFERENCES CITED

The following references are of record in the file of this patent:

UNITED STATES PATENTS

| Number | Name | Date |
|---|---|---|
| 1,166,128 | Hapgood | Dec. 28, 1915 |
| 1,460,924 | Searle | July 3, 1923 |
| 1,813,578 | Lachance | July 7, 1931 |
| 2,318,536 | Stern | May 4, 1943 |
| 2,336,750 | Roney | Dec. 14, 1943 |
| 2,392,202 | Tornblom | Jan. 1, 1946 |

FOREIGN PATENTS

| Number | Country | Date |
|---|---|---|
| 692,632 | France | Aug. 5, 1930 |